Inventor
H. C. Gull

May 3, 1966  H. C. GULL  3,249,147
FILM EVAPORATORS

Filed June 14, 1963  4 Sheets-Sheet 2

Inventor
H. C. Gull

By
Attorneys

May 3, 1966 H. C. GULL 3,249,147
FILM EVAPORATORS
Filed June 14, 1963 4 Sheets-Sheet 3

Inventor
H. C. Gull
By
Attorneys

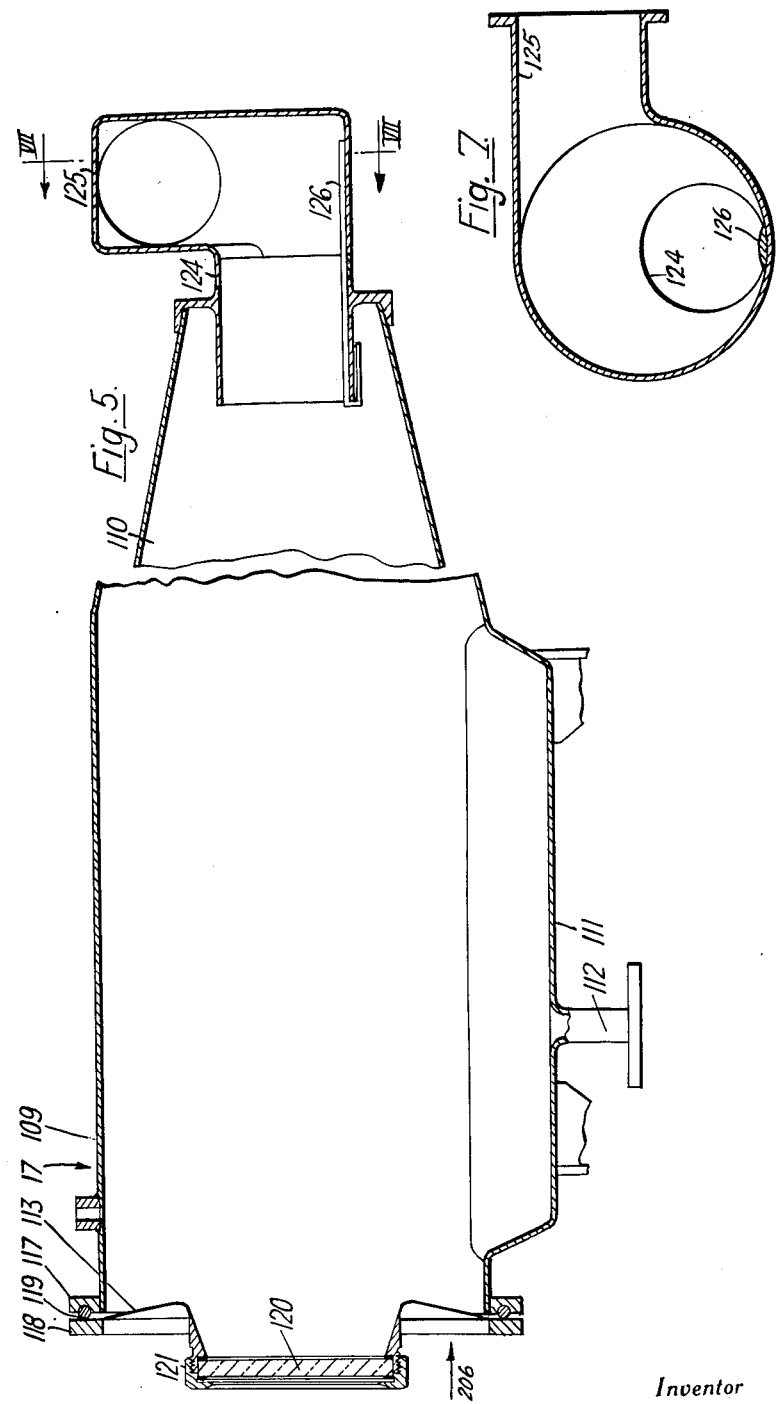

3,249,147
FILM EVAPORATORS
Herbert Charles Gull, Strood, Rochester, England, assignor to Burnett & Rolfe Limited, Rochester, England, a British company
Filed June 14, 1963, Ser. No. 287,927
Claims priority, application Great Britain, July 3, 1962, 25,487/62
2 Claims. (Cl. 159—13)

Evaporators of various kinds have been used in the past for evaporating milk, gelatine solutions, other liquid food products or other solutions of solids in liquids but all have had their disadvantages. With climbing film evaporators the lower ends of the evaporator tubes of the calandria are filled with liquid so that the heat transfer is inefficient and it is only in the upper parts of the tubes that a moving liquid film is produced and the heat transfer is satisfactory. The tubes which are very expensive have therefore had to be longer than would be necessary if efficient heat transfer were obtained along substantially the whole of their length. The overall height of climbing film evaporators is very considerable and therefore tall and specially constructed buildings are necessary to house them. A third and most important disadvantage of climbing film evaporators is that due to the flooding of the bottoms of their tubes they hold a considerable volume of liquid. This means that for a given rate of flow through the evaporator the liquid will remain in the evaporator for a longer time than it would if the evaporator held less. Milk in particular deteriorates if it is heated for long periods and protein is deposited on the tubes which reduces their efficiency.

Falling film evaporators overcome some of these disadvantages but their overall height is even greater than that of climbing film evaporators of comparable output.

The inventor has now discovered that by using a calandria with tubes of the correct proportions and controlling the supply of liquid to the tubes correctly it is possible to produce a very satisfactory turbulent flow in evaporator tubes arranged substantially horizontally. The liquid boils and a film of liquid travels along the walls of the tube. In the space within this tube there is an atmosphere of steam and suspended droplets and the flow conditions are such that the film keeps draining down and is restored by liquid from the droplets. These conditions produce a particularly effective heat transfer between the liquid and the heated tubes and it will take place in this efficient manner along the whole length of the tubes.

To bring these conditions about, according to the present invention, the liquid is supplied in separate steams or sprays to heated evaporator tubes which are arranged substantially horizontally and each of which is between ¾ inch and 1⅜ inches in internal diameter and between 8 feet and 16 feet long, the rate of supply being such that the tubes are not flooded. Preferably, to produce the best results, the tubes are 1.16 inches in internal diameter and 10 feet long. The tubes may however be stepped and thus vary in diameter between the limits given.

The tubes are preferably exactly horizontal as this gives the most compact and simplest arrangement. The required results are still produced however if the tubes are inclined at an angle of up to about 20° and the term "substantially horizontal" is intended to cover this.

In common types of film evaporator, such as climbing film and falling film evaporators, the evaporator tubes are heated externally by steam or vapour at a temperature some 25° to 60° F. hotter than the liquid in the tubes. The heating steam is usually supplied from a boiler which operates at a comparatively high presure and it is common practice to obtain additional steam economy by recompressing part of the evaporated vapour using the surplus energy of the high pressure steam in a jet compressor.

In such evaporating installations, the boiler plant which provides the thermal power in the form of high energy steam to operate the evaporator, and the condensing and cooling plants which finally absorb the degraded heat after it has passed through the evaporator, are comparatively large and expensive pieces of apparatus.

A single effect evaporator can be made to operate effectively without a supply of steam from external sources and without the necessity for an external heat source, provided that vapour evaporated from the liquid can be compressed by mechanical means to a sufficiently high pressure and temperature to serve as heating steam for the evaporator from which it came. A mechanical compressor suitable for this purpose takes up very much less room than the boiler plant and the cooling plant required for an ordinary evaporator supplied with live steam and various proposals have been made for the operation of an evaporator in this manner. None however appears to have been a commercial success, particularly at pressures substantially below one atmosphere. We have found however that by using the method of evaporation in accordance with the present invention, many of the difficulties in the use of mechanical recompression can be overcome and, in accordance with a further feature of the present invention, the vapour evaporated from the liquid in the substantially horizontal tubes is compressed in a compressor of high isentropic efficiency and is then supplied to the outsides of the tubes to heat them and bring about further evaporation. Suitable compressors are, for example, those of the axial flow turbine type, Lysholm compressors and Roots blowers. Roots blowers have a combined volumetric and isentropic efficiency of about 40 percent but this is nevertheless high compared with that of many other types. Thermodynamically, it is sufficient to increase the pressure and temperature of the evaporated vapour by only a small amount to enable it to be used as a means for heating the evaporators. However, the heat transfer through the tubes is proportional to the temperature difference betwen the two sides of the tube surfaces and therefore the smaller the temperature difference the larger the surface required. When a mechanical compressor is employed, the operating costs increase as the pressure and temperature differences increase and it is therefore necessary to discover the optimum conditions under which the combination of cost of heat transfer surfaces and the operating cost is a minimum. The method in accordance with the present invention produces a high heat transfer coefficient for the tube surfaces provided and this permits the use of an economic temperature difference of between 10 and 20° Fahrenheit compared with a value of 25 to 35° Fahrenheit in the older types of climbing and falling film evaporators. The mechanical compressor may therefore consume at least 50 percent less power than would be required to operate such a compressor with the older type of evaporator.

To ensure that the turbulent flow and the film is built up as near as possible to the inlet ends of the tubes, it is preferable to preheat the liquid above evaporation temperature if the liquid is water; this is also desirable but by no means essential with liquids which tend to froth, such as milk and gelatine solutions. With these liquids the correct conditions come about very near the beginning of the tubes even if the liquid is supplied to them at evaporation temperature. Too much liquid increases the pressure drop along the tube unduly and too little liquid starves the heating surface of the liquid. The rate at which the liquid is supplied to each tub depends, of course, amongst other factors on the heat supply to the tube, but is in general 2 to 3 times the evaporation rate in each tube.

An evaporator for evaporating liquid food products, such as milk, by the method in accordance with the invention is also novel and forms another aspect of the present invention. According to this, the evaporator includes a calandria having a number of substantially horizontal evaporator tubes, each of which is between ¾ and 1⅜ inches in internal diameter and between 8 feet and 16 feet long, the calandria also having means at the inlet ends of the tubes for delivering either a spray or separate streams of the liquid into the tubes.

In order to make efficient use of the steam supplied to an evaporator it is a common practice to use the steam evaporated from the liquid being treated to evaporate a second quantity of liquid and sometimes to use the steam from the second quantity of liquid to evaporate a third quantity. An evaporator for doing this is known as a double or triple effect evaporator according to the number of stages. Of course the temperature and pressure of the steam gets lower and lower in each stage.

Now, some foodstuffs, notably milk, deteriorate rapidly if heated above a certain temperature. In the case of milk this is about 160 degrees F. The temperature of the steam evaporated from the final effect cannot of course drop below that of the cooling water in which it is finally condensed and if a cooling tower is used to cool the water the temperature of the water in summer in this country may not be below 100 degrees F., when carrying an economic heat load. Allowing for losses this gives a total available temperature range for the milk of about 50 degrees F.

It has been found that another very considerable advantage of evaporators in accordance with the present invention, besides their small overall height and efficient heat transfer, is that the pressure drop through the tubes is comparatively small and in consequence the temperature drop across the tube wall can be kept small as well and may be of the order of only 10 to 12 degrees F. This makes it perfectly practicable to make triple or even quadruple effect evaporators which can be used for evaporating milk.

The low pressure drop through the tubes of the calandria results in a further reduction in the power consumed by the compressor when this is provided for compressing the vapour to heat the calandria.

If it were possible to carry out the recompression of the vapour under theoretically perfect but practically unobtainable conditions the compression would be adiabatic or isentropic. In a practical compressor the isentropic efficiency is less than 100% and the actual temperature rise is proportionately greater. As a result the vapour becomes superheated; an example will make this clear. Saturated water vapour arising from water at 140° F. has an absolute pressure of 2.88 p.s.i. To operate an evaporator in the manner described, the condition of this vapour must be changed from that produced, to saturated vapour at 4.9 p.s.i.a. pressure at a temperature of 160° F. By direct compression of the vapour at 140° F. from 2.88 p.s.i.a. to 4.9 p.s.i.a., using a Roots types blower with an isentropic efficiency of 41%, the temperature rises to 335° F In an axial flow compressor with an isentropic efficiency of 83% the temperature would rise to 236° F. In a theoretically perfect compressor the temperature would rise adiabatically to 220° F. Thus much power is lost in a useless superheat even when the increase in saturated vapour pressure corresponds to only 20° F.

However if a mechanical compressor is used with a conventional climbing or falling film evaporator, a much higher pressure difference must be produced and the wastage is magnified in proportion.

Another disadvantage of this superheat arises from the poor heat transfer rates obtainable with superheated vapours and it is most desirable to prevent the superheat from occurring.

To achieve this, in accordance with a further feature of the invention, a water spray nozzle is provided in the inlet to the compressor and through this a water spray enters the compressor with the vapour. By this means, the liquid water in the spray is converted into steam by the superheat at the moment it is developed, and the compressed vapour emerges from the compressor at or near saturation temperature at the higher pressure and in a condition suitable for immediate use by condensation on the tubes of the calandria at the high rate of heat transfer obtainable with saturated vapours. The use of a liquid spray to suppress the development of superheat results in conversion of the extra energy unavoidably introduced during compression, into saturated steam which is available to pre-heat the liquid to be evaporated, immediately prior to its entry into the heating calandria.

In the calandria, the tubes are arranged parallel to each other and are surrounded by a shell which forms the steam jacket as is usual and the means for supplying the liquid to the tubes preferably comprises an inlet chamber which is separated from the tubes by a plate and one opening through the plate for each tube. The liquid is supplied under pressure to the chamber and each opening thus directs a stream of liquid into its own individual tube. Each opening is preferably a bore having its axis inclined to that of the tube which is supplied so that the liquid issuing from it impinges on the wall of the tube. This breaks up the liquid and enables the required conditions in the tube to be developed at the inlet end of the tube. The inclined bore may open into a bore of larger diameter at its end adjacent to the tube. This bore of larger diameter has its axis parallel to that of the tube, it being found that this arrangement produces an eruptive splutter of the liquid at the entry to the tube which produces particularly good results.

After the liquid has been evaporated in the tubes of the calandria, both the residual liquid and the vapour pass as is usual into a separator. This separator preferably comprises a cylindrical casing with a truncated conical section at one end, a tangential inlet pipe, leading from the calandria, at the end of the cylindrical casing remote from the truncated conical section, a liquid sump and outlet at the bottom of the cylindrical casing and a vapour outlet at the smaller end, which is remote from the cylindrical casing, of the truncated conical section of the casing. This separator works on the cyclone principle. The incoming mixture of liquid and vapour flows into the cylindrical casing and through the cylindrical casing along a helical path. During a passage along this path, the liquid is flung outwards and drops into the bottom of the cylindrical container whence it flows into the sump and through the outlet. As the vapour reaches the tapering truncated conical section of the separator, the radius of its path is decreased and in consequence its angular velocity increases. The centrifugal force exerted on the suspended liquid droplets is increased and still more liquid is flung outwards and drains into the sump.

An example of a method of evaporating liquid food products in accordance with the invention and also an example of an evaporator for carrying out this method will now be described with reference to the accompanying drawings, in which:

FIGURE 1 in a digrammatic illustration of the evaporator and also forms a flow diagram illustrating the flow of the liquid food product through it;

FIGURE 5 is a longitudinal section through the separator;

FIGURE 7 is a section taken along the line VII—VII of FIG. 5.

Figure 1:
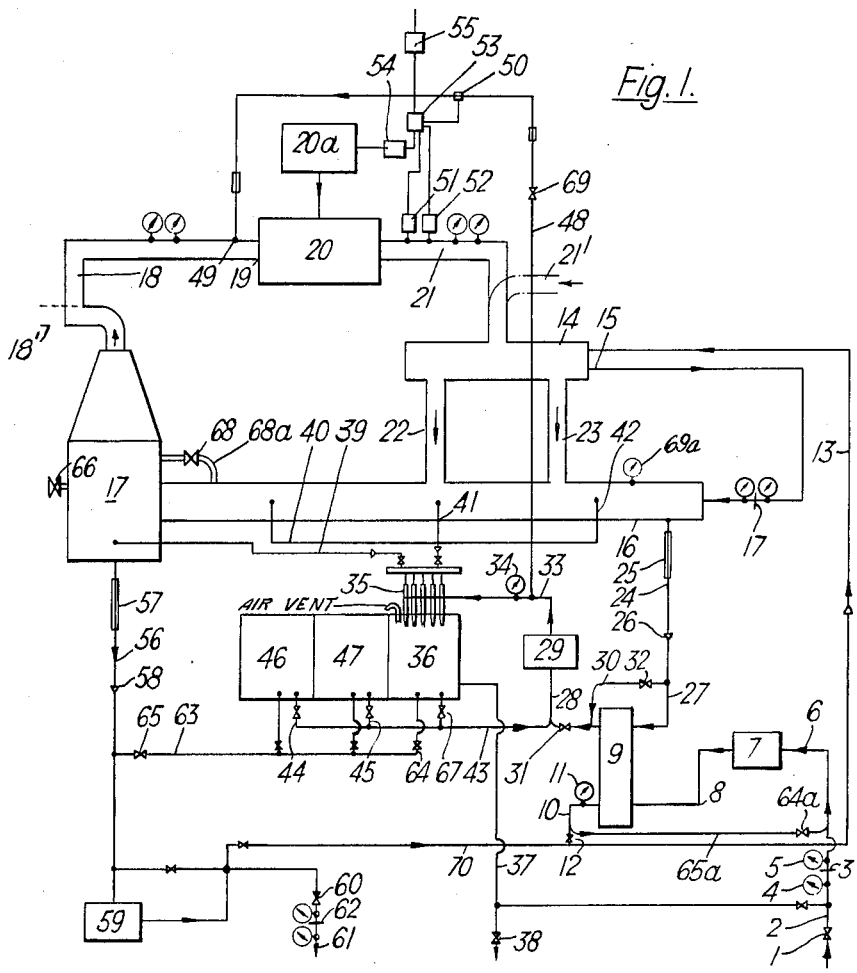

The evaporator to be described by way of example is of the single effect type, but the invention is also applicable to multi-effect evaporators as well.

The evaporator and its operation will be described with reference to the evaporation of milk, but it can of course be used for evaporating other liquid food stuffs such as gelatine solutions as well, or, indeed, any other solution of solid in a liquid.

The milk is supplied from a feed tank (not shown) through a stop valve 1 and thence through a pipe 2 to a flow meter comprising an orifice plate 3, with pressure gauges 4 and 5 which give an indication of the pressure drop through the orifice. From the flow meter the milk passes through a pipe 6 to the inlet of a rotary feed pump 7 whence it is delivered through a pipe 8 to a preheater 9.

From the preheater 9 the milk passes through a pipe 10 fitted with a pressure gauge 11 to a main control valve 12 which controls the volume of milk flowing into the evaporator.. From the control valve 12 the milk flows through a pipe 13 into the tubes of a second preheater 14. The milk leaves the preheater 14 through a pipe 15 whence it flows to the inlet chamber of a calandria 16. The pipe 15 is fitted with a further flow meter 17' consisting of an orifice plate and two pressure gauges for measuring the pressure drop through the orifice.

From the inlet chamber of the calandria 16, the milk is injected in streams into the tubes of the calandria (which is described in detail later) and in these tubes it is evaporated. Both the vapour and the concentrated liquid milk pass from the tubes of the calandria 16 into a separator 17 which is also described in detail later on.

At this stage the paths of the vapour and the concentrated liquid milk diverge from each other. The vapour passes from one end of the separator 17 through a pipe 18 to the inlet 19 of a compressor in the form of a Roots blower 20 driven by an electric motor 20a. The compressed vapour, which is heated by compression, is blown through a pipe 21 into the shell of the second preheater 14 whence it passes through pipes 22 and 23 into the heating jacket of the calandria 16. The vapour, which is of course steam at sub-atmospheric pressure, is condensed in the calandria 16 and the liquid condensate leaves through a pipe 24 fitted with a sight glass 25 and a non-return valve 26. From the pipe 24, some of the condensate passes through a pipe 27 and thence through the first preheater 9 and through a pipe 28 to the suction of a condensate pump 29 and the remaining part of the condensate passes directly to the suction of the pump 29 through a pipe 30. The proportions of the condensate passing through the preheater 9 and through the by-pass pipe 30 to produce the requisite preheating of the milk feed, is controlled by control valves 31 and 32 in the pipes 28 and 30 respectively.

The condensate pump 29 delivers the condensate through a pipe 33 fitted with a pressure gauge 34 to a number of vacuum jet pumps 35 arranged in parallel. The jet pumps 35 deliver the condensate into a tank 36 whence excess water passes to waste through an outlet pipe 37 fitted with a valve 38. The vacuum jet pumps suck from the separator 17 through a pipe 39 and from three points in the calandria 16 through pipes 40, 41 and 42 to remove air dissolved in the vapor from these places and maintain the correct vacuum. To maintain a sufficient supply of water to the jet pumps 35, there is a recirculating connection 43 leading from the tank 36 into the inlet pipe 28 of the condensate pump 29.

The recirculating pipe 43 can also be connected through pipes 44 and 45 to detergent tanks 46 and 47 respectively. The pipes 44 and 45 are fitted with valves and these are only opened when the evaporator is being shut down so that all the various pipes and pieces of apparatus can be washed through to remove the concentrated milk adhering to their surfaces.

A further pipe 48 leads from the outlet pipe 33 of the condensate pump 29 and supplies water to a water spray 49 in the vapour inlet to the compressor 20. This water spray reduces the superheat which is otherwise produced in the compressed steam because of the comparatively low isentropic efficiency of the Roots blower 20.

The electric motor 20a which drives the Roots blower 20 is fitted with a number of electrical safety devices which include a cut-out switch 50 which operates if the water supply to the spray 49 fails and also switches 51 and 52 which operate if the pressure or temperature in the outlet pipe 21 become excessive. All the switches 50 to 52 control a motor cut-out switch 53 and this in turn is connected to the motor through an overload switch 54. The motor is supplied through a starter 55.

The concentrated liquid milk drains into a sump (described later) in the separator 17 and thence it passes through a pipe 56 fitted with a sight glass 57 and an non-return valve 58 to an extraction pump 59 which delivers the milk through a control valve 60 to an outlet 61. The outlet 61 is fitted with a flow meter 62. The extraction pump 59 has a further inlet pipe 63 by which it can be connected to the detergent tanks 46 and 47 for cleaning out purposes when the evaporator is shut down.

A number of other by-pass pipes and cross connections are provided for circulatng the milk and vapour through closed circuits when the evaporator is initially started up and before steady conditions have been established. The starting up procedure is as follows:

Valves 64 and 65 in the pipe 63 are opened to allow water to flow from the tank 36 into the pump 59 which is then started. The valve 61 is closed and the valves 64 and 65 are left open until the main circulation system is full and a water level appears in the sight glass 57 indicating that the main circulation system is filled to its working level.

The feed circulation system is next filled with water by connecting the inlet valve 1 to a water supply, opening the valves 1 and 64a and starting the pump 7. During this operation the valve 12 is slightly opened to serve as an air vent to let air out of the system. As soon as all air is purged from the system, the valve 12 is closed and a valve 64a in a by-pass pipe 65a is partially closed until the pressure gauge 11 shows 25–30 p.s.i. pressure. The valve 1 is then connected to a supply of milk to be evaporated in readiness for the start of the evaporation proper.

The condensate circulation system is next started by opening a valve 67 to admit water from the tank 36 to the pump 29 which is then started with the valves 31 and 32 closed. Water is thereby pumped through the pipe 33 to the jet pumps 35 which start to exhaust air from the internal spaces of the evaporator. As soon as a vacuum of 20–23 inches of mercury has been obtained, a valve 66 on the separator 17 is opened just enough to admit air at the same rate as it is being removed by the jet vacuum pumps 35 thus maintaining the vacuum. A by-pass valve 68 in a pipe 68a connecting the separator 17 to the shell of the calandria 16 is then fully opened and the compressor 20 is started. At the same time a valve 69 is opened to admit water from the tank 36 to the spray nozzle 49. The opening of the valve 68 is then adjusted to load the compressor motor fully so that the whole system starts to warm up. As the temperature rises the valve 66 is progressively closed and the mixture of air and water vapour circulated by the compressor becomes progressively poorer in air and richer in water vapour. The valve 68 is also progressively closed to maintain the load on the compressor as indicated by an ammeter in the circuit of the driving motor. This process continues until the vacuum indicated by the pressure gauge 69a on the shell of the calandria 16 approaches 28 inches Hg and the temperature in the separator 17 rises to 140° F. or whatever working temperature is desired. At some point in this process the liquid circulating through the calandria tubes starts to boil and a mixture of vapour and spray commences to gush from the calandria tubes into the separator. At this point the control valve 12 is opened and adjusted so that the liquid level in the sight glass 57 remains constant. Further, condensate appears in the sight glass 25 and the valve 31 is opened to allow condensate to be withdrawn from the system so that the visible level in sight glass 25 is left steady.

The valve 32 by-passes the preheater 9 and is used to maintain the temperature of the evaporator at the desired value. With the valve 32 closed the system warms up and with it fully open, it cools down. A thermostatic control may be fitted to the valve if required.

Slowly the normal circulating conditions with the flows through the pipes already described are achieved. The balance of the liquid and strength of concentrate evaporated are maintained by adjusting the control valve 12 which controls the raw milk input and also the control valve 60 which controls the condensed milk output. The operating levels of condensate output and condensed milk output are seen from the sight glasses 25 and 57. With the driving motor 20a having an output of 10 horse power and the calandria having a duty of 200 thousand B.t.u. per hour the following steady flows are achieved when the evaporator is in normal operation and a recirculation is taking place from the pump 59 through a pipe 70 to add to the output from the preheater 9 through the pipe 10:

Milk input at valve 1, 300 lb./hr. at 40° F., heat content 2,400 B.t.u./hr.;
Output from preheater 9, 300 lb./hr. at 99° F., heat content 20,100 B.t.u./hr.;
Input to preheater, 600 lb./hr. at 119.5° F., heat content 52,500 B.t.u./hr.;
Preheater 14, duty 18,353 B.t.u./hr., 18.3 lb./hr. vapour condensed;
Milk output from preheater 14, 600 lb./hr. at 150° F., heat content 70,800 B.t.u./hr.;
Calandria 16, duty 196,780 B.t.u./hr., 196.2 lb./hr. vapour condensed;
Calandria output, Vapour 200 lb./hr. at 140° F., and 2.885 p.s.i.a., sensible heat 21,580 B.t.u./hr., latent heat 202,800 B.t.u./hr. Total 224,380 B.t.u./hr.;
Liquid condensed milk, 400 lb./hr. at 140° F., heat content 43,200 B.t.u./hr.;
Recirculating pipe 70, 300 lb./hr. at 140° F., heat content 32,400 B.t.u./hr.;
Final product through valve 60, 100 lb./hr. at 140° F., heat content 10,800 B.t.u./hr.;
Energy input to compressor from 10 horse power electric motor 18,000 B.t.u./hr.+spray water in inlet 14.5 lb./hr. at 45.4° F., giving total vapour output of 214.5 lb./hr. at 160° F., sensible heat 27,456 B.t.u./hr., latent heat 215,18 B.t.u./hr., total heat 242,574 B.t.u./hr. to preheater 14;
Condensate from calandria 16, 214.5 lb./hr. at 160° F., heat content 27,456 B.t.u./hr. to first preheater 9;
Condensate output from preheater 9, 214.5 lb./hr. at 77.5° F., heat content 97,756 B.t.u./hr.

Instead of conducting the steam from the separator 17 through the pipe 18 to the compressor 20, it may pass through a pipe 18′ either directly to a condenser if the evaporator is to work on a single effect, or to the steam jacket of the calandria of a second effect if the evaporator is of the multi-effect type. When this is done, the calandria is heated by a supply of live steam through a pipe 21′ instead of with a supply of steam from the compressor 20 through the pipe 21. The live steam in the pipe 21′ may be mixed with some of the exhaust vapour passing through the pipe 18′ or with steam from the last effect in a multi-effect evaporator. This method of heating an evaporator is however common practice and will not be described in any further detail.

Most of the parts of the evaporator described with reference to FIGURE 1 are standard pieces of apparatus, such as pumps, preheaters, and valves, but the calandria 16 and the separator 17 are both of novel construction and are illustrated in FIGURES 2 to 6 of the drawings.

Figure 2:
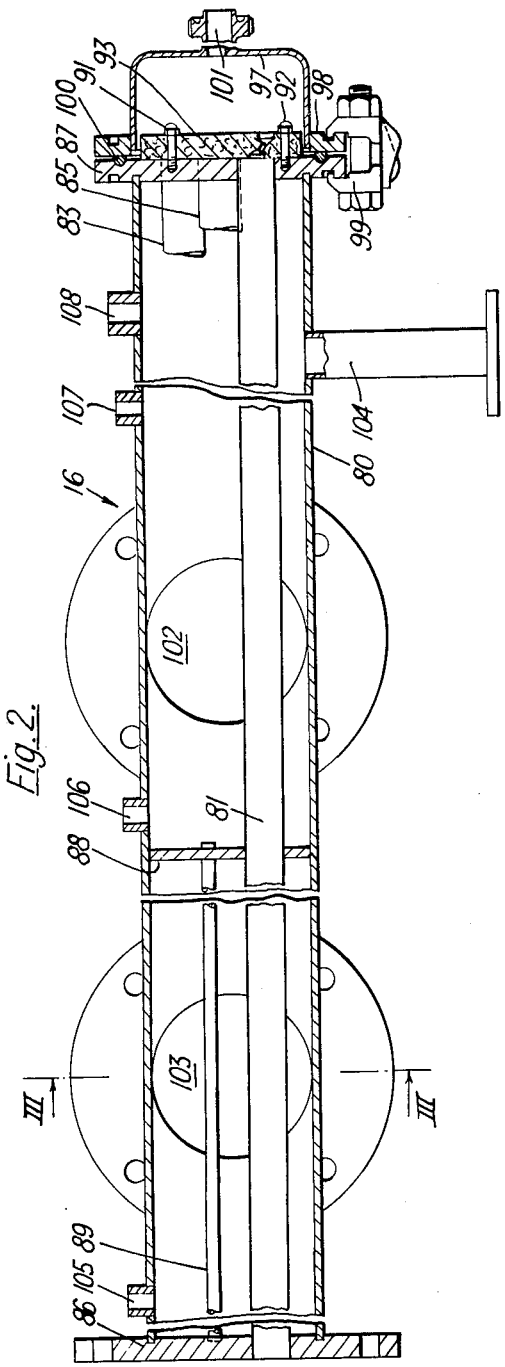
FIGURE 2 is a longitudinal section through the calandria as seen in th direction of the arrows on the line II—II in FIGURE 3.
Figure 3:
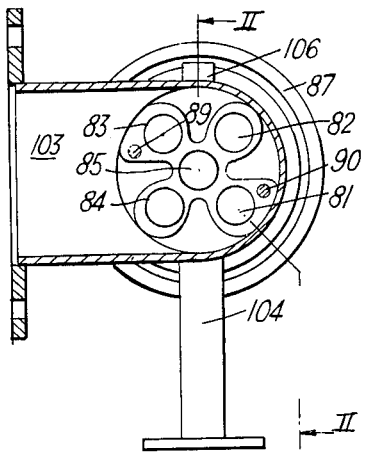
FIGURE 3 is a cross-section through the calandria as seen in the direction of the arrows on the line III—III in FIGURE 2.
Figure 4:
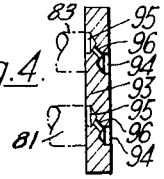
FIGURE 4 is a section taken along the line IV—IV of FIG. 4A, showing the ends of the evaporator tubes in phantom lines.
Figure 4A:
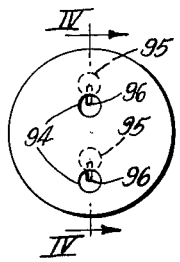
FIGURE 4A is an end view of the jet plate through which the liquid enters the calandria.

Referring to FIGURES 2 and 3, the calandria 16 comprises a tubular casing 80 forming a steam jacket in which five tubes 81 to 85 are supported. The tubes 81 to 85, each of which is 10 feet long, 1¼ inches external diameter and 18 gauge thick giving an internal diameter of 1.16 inches, are supported at their ends in plates 86 and 87 and at approximately their mid point in a third plate 88. The plate 88 has four lobes which surround the tubes 81 to 84 and between these lobes are open spaces to allow the vapour to flow through the tubular jacket 80 with as little obstruction as possible. The plate 88 is held in position along the length of the tubular jacket 80 by means of tie rods 89 and 90 by which it is fixed to the end plate 86.

The plate 86 is fixed directly on the end of the tubular jacket 80 which it closes, and it also forms a flange by which the calandria is fixed to the separator 17.

The plate 87 closes the other end of the tubular jacket 80 and fixed to it by screws 91 and 92 is a jet plate 93. This plate is shown in detail in FIGURE 4 of the drawings and for each of the evaporator tubes 81 to 85, it has in one face a blind bore 94, in the other face a blind bore 95 and an inclined bore 96 extending between the two blind bores. The plate 93 is enclosed within an end cap 97 which is of the same diameter as the tubular jacket 80 and forms an inlet chamber for the raw milk. The end cap 97 has a flange 98 welded to it and this flange is clamped to the end plate 87 by a number of clamps one of which is shown at 99. The joint between the flange 98 and the end plate 97 is sealed by a rubber ring 100.

Milk is supplied to the calandria through a pipe 15 as already described and this pipe is connected to an inlet 101 welded axially to the end cap 97. The chamber within the end cap 97 is filled with milk and it is then squirted through the inclined bores 96 and as it passes into the blind bores 95, a spray effect is produced which spatters the milk over the whole of the insides of the bores of the tubes 81 to 85. The diameters of the bores 96 are such that each will pass approximately three pounds of liquid milk per minute with a pressure differential across the plate of about 5 p.s.i. The inclination of the bores 96 to the axes of the tubes 81 to 85 combined with their emergence into larger blind bores on the downstream side of the plate 93 causes the emerging milk to be directed onto the inside of the tubes 81 to 85 as the milk boils. An eruptive splutter is produced at the entry to the tubes 81 to 85.

The tubular casing 80 is provided with two vapour inlets 102 and 103 which are connected to the pipes 23 and 22 respectively. At the bottom of the casing 80 near the end plate 87 is a condensate outlet pipe 104 which is fixed to the top of the sight glass 25 and spaced along its length are three bosses 105, 106 and 107 for the connection of the air extraction pipes 40 to 42. There is a fourth boss 108 for a pressure gauge.

In the example shown, the vapour inlets 102 and 103 are near the right hand end, that is the milk inlet end of the calandria jacket and the air outlet openings 105 and 107 are spaced apart along its length. As an alternative to this, the heating steam connection may be near the milk inlet end of the calandria jacket and the air outlets may be all situated near the other end of the jacket.

Figure 6:
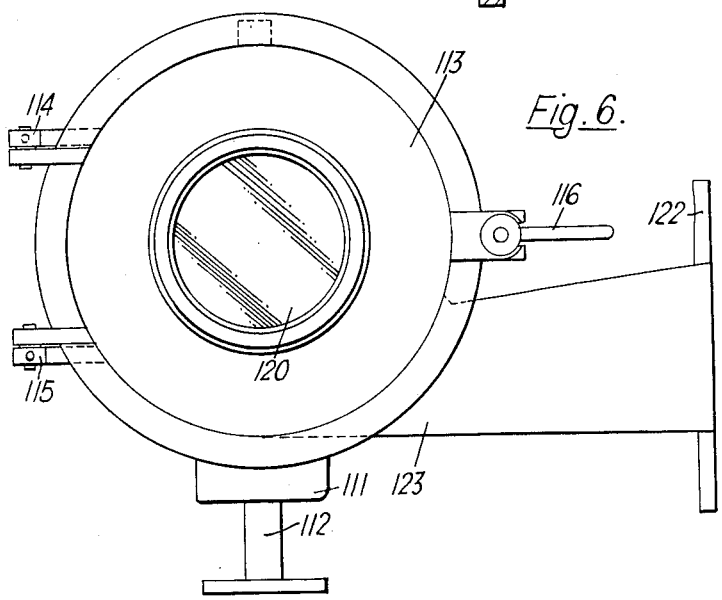
FIGURE 6 is an end elevation of the separator as seen in the direction of the arrow 206 in FIGURE 5.

As shown in FIGURES 5 and 6, the separator 17 comprises a cylindrical housing 109 with a truncated conical section 110 at its right hand end. At the bottom of the cylindrical section 109 is a liquid sump 111 leading from this is a pipe 112 having a flange for fixing it to the sight glass 57. The left hand end of the separator 109 is closed by a cover 113 which is carried on hinges 114 and 115 (see FIGURE 6) and is held shut when the evaporator is in use by a locking handle 116. The casing 109 has a flange 117 and the cover 113 has a similar flange 118, the two flanges being sealed to each other when the cover is closed, by a rubber sealing ring 119. The cover 113 is provided with a circular window 120 which is held in position by a screwed ring 121.

The plate 86 at the left hand end of the casing 80 of the calandria 16 is fixed to a flange 122 on a tapering inlet pipe 123. The inlet pipe extends into the casing 109 in a tangential direction as shown in FIGURE 6.

The vapour outlet from the separator is through the smaller end of the truncated conical section 110 through a pipe 124 which has a continuation 125 which extends upwards and inwards into the plane of the paper as shown in FIGURE 5. This upward and inward extension of the pipe 124 forms an involute which destroys the rotational energy of the vapour passing through the pipe 124. In use, the vapour flows into the separator through the pipe 123 and its velocity increases as the cross-sectional area of the pipe 123 decreases. The vapour therefore passes with a circular motion round the outer part of the casing 109 and its angular velocity is increased as it moves with a helical motion of decreasing diameter down the truncated conical portion 110. This rotational movement of the vapour causes any droplets in it to be flung outwards when they drain outwards into the sump 111 and are withdrawn through the pipe 112. A small amount of liquid in the form of droplets may remain trapped in the vapour as it flows through the pipe 124 and then be deposited as the rotational velocity of the vapour is destroyed. The velocity of flow through the pipe 124 is so great that the liquid may not be able to flow back into the separator against the flow of vapour. To enable it to do this, an inverted half round gutter 126 is provided in the bottom of the pipe 124 and this gutter extends, as shown in FIGURE 5, over the left hand end of the pipe 124 and along its underside. This gutter enables liquid to trickle back through it and trickle out of its bottom end where there is no vapour flow to prevent it doing so. The gutter 126 is held in position by its formation which enables it to be clipped over the end of the pipe 124 and it is readily removable for cleaning.

The internal diamemter of the cylindrical part 109 of the casing is made of a diameter such that if all the vapour passing through it were moving in a direction parallel to its axis, the velocity of the vapour will be no greater than 12 feet per second at a pressure of 5 pounds per square inch absolute and not greater than 30 feet per second at a pressure of 1.5 pounds per square inch absolute for saturated water vapour and pro-rata for other pressures and densities of other vapours. The portion 109 should be at least as long as the diameter of the jacket 80 of the calandria discharging into it and in this example it is three and a half times longer than this diameter as considerable frothing of the milk is likely to occur. The angle between the conical surfaces of the section 110 and the horizontal axis is 15 degrees, that is to say the angle of conicity is 30 degrees. The diameter of the tube 124 is approximately one third of that of the part 109 of the casing and its involute form minimizes the pressure drop at the separator outlet.

The window 120 in the cover 113 allows visual control of the flow through the separator whilst the evaporator is in operation.

During its passage through the tubes 81 to 85 of the calandria 16, the milk produces approximately ¾ pound to 1¼ pounds of vapour per minute in each tube.

I claim:

1. An evaporator for evaporating solutions of solids in liquids, including in combination an improved calandria which comprises a plurality of substantially horizontal evaporator tubes, each of said tubes being between about ¾ inch and about 1⅜ inches in internal diameter and between about 8 feet and about 16 feet in length, and means mounting said tubes parallel to each other, means for heating the exterior surfaces of said tubes to a temperature no more than 20° F. above that of the interior surfaces of said tubes and comprising a shell surrounding said tubes and forming a steam jacket, means for supplying solution to said tubes at a rate no more than three times the evaporation rate therein, an inlet chamber for receiving the solution thus supplied, a plate separating said inlet chamber from said tubes, said plate being pierced by a plurality of bores, each for directing a stream of said liquid from said chamber into an end of one of said tubes, the axis of said bores being inclined to those of said tubes whereby liquid issuing therefrom impinges on the walls of said tubes, said bores having countersinks at each end, the axes of said countersinks being parallel to those of said tubes, and a separator connected to receive vapor from said calandria, said separator comprising a casing having a horizontal cylindrical main section and terminating at one end in a coaxial truncated conical section having its smaller end remote from said main section, an inlet pipe leading tangentially into the end of said cylindrical casing remote from said truncated conical section, means for conducting vapor from said calandria tubes to said inlet pipe, a liquid sump and outlet pipe at the bottom of said cylindrical casing section and a vapor outlet at the smaller end of said truncated conical section.

2. An evaporator as claimed in claim 1, further comprising a compressor having a high isentropic efficiency, means for conducting vapour from said tubes of said calandria to said compressor, and means for conducting compressed vapour from said compressor to said jacket, whereby said compressor compresses said vapour from liquid evaporated in said tubes and supplies said compressed vapour to said jacket to heat said tubes and bring about further evaporation.

References Cited by the Examiner

UNITED STATES PATENTS

| | | | |
|---|---|---|---|
| 1,118,041 | 11/1914 | Nobel et al. | 159—24 |
| 1,200,996 | 10/1916 | Soderlund et al. | 159—24 |
| 1,390,677 | 9/1921 | De Baufre | 159—24 X |
| 1,425,005 | 8/1922 | Gensecke | 159—24 X |
| 1,461,640 | 7/1923 | Wirth-Frey | 159—24 X |
| 1,465,020 | 8/1923 | Monti | 159—24 |
| 1,582,066 | 4/1926 | Moore | 159—20 X |
| 1,778,959 | 10/1930 | Peterson | 159—13 |
| 2,076,597 | 4/1937 | Robinson et al. | 159—24 X |
| 2,214,658 | 9/1940 | Browning | 159—416 X |
| 2,244,467 | 6/1941 | Lysholm | 55—416 X |
| 2,519,913 | 8/1950 | Lysholm | 230—143 |
| 2,554,138 | 5/1951 | Cross | 159—31 |
| 2,562,495 | 7/1951 | Hulme | 159—49 |
| 2,713,895 | 6/1955 | Eckstrom | 159—13 X |
| 2,764,233 | 9/1956 | Skinner | 159—13 |
| 2,863,501 | 12/1958 | Farnsworth | 159—24 |
| 3,073,380 | 1/1963 | Palmason | 159—49 |
| 3,099,607 | 7/1963 | Lustenader et al. | 159—24 X |
| 3,111,462 | 11/1963 | Silver | 159—2 X |

FOREIGN PATENTS

| | | |
|---|---|---|
| 17,785 | 4/1882 | Germany. |
| 1,132,096 | 6/1962 | Germany. |
| 93,224 | 1/1960 | Holland. |
| 356,401 | 1/1938 | Italy. |

NORMAN YUDKOFF, *Primary Examiner.*